United States Patent
Lee et al.

(10) Patent No.: US 10,678,301 B1
(45) Date of Patent: Jun. 9, 2020

(54) ASSEMBLED INDUSTRIAL TABLET

(71) Applicant: MOXA INC., New Taipei (TW)

(72) Inventors: Yuan-Cheng Lee, New Taipei (TW); Chung-Kun Hou, New Taipei (TW); Hsiao-Chen Chen, New Taipei (TW); Li-An Yang, New Taipei (TW)

(73) Assignee: Moxa Inc., New Taipei (TW)

( * ) Notice: Subject to any disclaimer, the term of this patent is extended or adjusted under 35 U.S.C. 154(b) by 0 days.

(21) Appl. No.: 16/528,853

(22) Filed: Aug. 1, 2019

(51) Int. Cl.
*G06F 1/16* (2006.01)

(52) U.S. Cl.
CPC .......... *G06F 1/1626* (2013.01); *G06F 1/1601* (2013.01); *G06F 1/1656* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,072,179 | B1* | 7/2006 | Curran | G06F 1/16 165/104.32 |
| 8,545,247 | B2* | 10/2013 | Aldana | H01R 13/6315 439/248 |
| 9,232,675 | B2* | 1/2016 | Schurr | H05K 5/0017 |
| 10,074,935 | B2* | 9/2018 | Kato | H01R 13/6315 |
| 10,481,636 | B2* | 11/2019 | Tarnoff | G06F 1/1626 |
| 10,503,208 | B2* | 12/2019 | Weldon | G06F 1/1632 |
| 2002/0135974 | A1* | 9/2002 | Bell | A47G 1/142 361/679.41 |
| 2012/0162908 | A1* | 6/2012 | Lo | G06F 1/1616 361/679.55 |
| 2012/0262890 | A1* | 10/2012 | Xiao | G06F 1/169 361/752 |
| 2014/0204511 | A1* | 7/2014 | Oh | G06F 1/1632 361/679.01 |
| 2016/0070300 | A1* | 3/2016 | Carnevali | G06F 1/181 361/679.41 |
| 2016/0233910 | A1* | 8/2016 | English | H04B 1/3888 |
| 2016/0353616 | A1* | 12/2016 | Dinh | G03B 15/03 |
| 2017/0194693 | A1* | 7/2017 | Chang | G06F 1/1643 |
| 2017/0300093 | A1* | 10/2017 | Hamann | G06F 1/1632 |
| 2017/0308122 | A1* | 10/2017 | Weldon | G06F 1/1686 |
| 2018/0059723 | A1* | 3/2018 | Wu | G06F 1/1632 |

* cited by examiner

*Primary Examiner* — Lisa Lea-Edmonds
(74) *Attorney, Agent, or Firm* — Winston Hsu (57) ABSTRACT

An assembled industrial tablet is provided. A first floating connector, which is disposed on a screen assembly, and a second floating connector, which is disposed on a tablet assembly, are assembled, and the tablet assembly is limited in an assembly space of the screen assembly through limiting structures of the screen assembly, so that the industrial tablet is assembled. Therefore, the technical efficiency of assembling the industrial tablet conveniently may be achieved.

9 Claims, 15 Drawing Sheets

ASSEMBLED INDUSTRIAL TABLET

BACKGROUND

1. Technical Field

The present disclosure relates to an assembled industrial tablet, and more particularly to an assembled industrial tablet which is assembled by assembling a first floating connector, which is disposed on a screen assembly, and a second floating connector, which is disposed on a tablet assembly, wherein the tablet assembly is limited in an assembly space of the screen assembly through limiting structures of the screen assembly.

2. Description of Related Arts

In one of the assembly aspects of a conventional assembled industrial tablet, a screen assembly and a tablet assembly are assembled through the connection lines. Since the positions of the connection lines are not limited, there is a problem of assembly interference due to the connection lines when assembling the screen assembly and the tablet assembly. Moreover, it is more likely that there is a problem that the connection lines are damaged during the assembly process of the screen assembly and the tablet assembly.

In conclusion, as can be known, the prior art has the problem of assembly interference due to the connection lines or damaging the connection lines when assembling the screen assembly and the tablet assembly; therefore, it is necessary to propose an improved technical solution to resolve the problem.

SUMMARY

In order to solve aforementioned problem of assembly interference due to the connection lines or damaging the connection lines when assembling the screen assembly and the tablet assembly, the present disclosure is to provide an assembled industrial tablet.

The assembled industrial tablet disclosed in the present invention includes a screen assembly and a tablet assembly.

The screen assembly has an assembly space, a plurality of limiting structures is disposed around the assembly space, and the screen assembly has a first floating connector exposed to the assembly space.

The tablet assembly includes a housing component and a circuit substrate. The housing component has an accommodating space. The circuit substrate is disposed in the accommodating space, and the circuit substrate has a second floating connector.

The screen assembly and the tablet assembly are assembled through the first floating connector and the second floating connector, and the tablet assembly is limited in the assembly space of the screen assembly through the limiting structures of the screen assembly, so that the industrial tablet is assembled.

In one embodiment, the tablet assembly moves in a direction parallel with the screen assembly to assemble the first floating connector and the second floating connector, and the tablet assembly is limited in the assembly space of the screen assembly through the plurality of limiting structures of the screen assembly, so that the industrial tablet is assembled.

In another embodiment, the tablet assembly moves toward the screen assembly in a direction perpendicular to a ground plane to assemble the first floating connector and the second floating connector, and the tablet assembly is limited in the assembly space of the screen assembly through the plurality of limiting structures of the screen assembly, so that the industrial tablet is assembled.

In the other embodiment, after the tablet assembly rotates 90 degrees in parallel with the screen assembly, the tablet assembly moves toward the screen assembly in a direction perpendicular to an ground plane to assemble the first floating connector and the second floating connector, and the tablet assembly is limited in the assembly space of the screen assembly through the plurality of limiting structures of the screen assembly, so that the industrial tablet is assembled.

According aforementioned content, the difference between the present disclosure and the conventional technology is that the first floating connector disposed on the screen assembly and the second floating connector disposed on the tablet assembly are assembled, and the limiting structures of the screen assembly limits the tablet assembly in the assembly space of the screen assembly, so that the industrial tablet is assembled.

By above technical means, the present invention can achieve the technical effect of assembly convenience of an assembled industrial tablet.

BRIEF DESCRIPTION OF THE DRAWINGS

The structure, operating principle and effects of the present disclosure will be described in detail by way of various embodiments which are illustrated in the accompanying drawings.

DETAILED DESCRIPTION

The following embodiments of the present invention are herein described in detail with reference to the accompanying drawings. These drawings show specific examples of the embodiments of the present invention. It is to be understood that these embodiments are exemplary implementations and are not to be construed as limiting the scope of the present invention in any way. Further modifications to the disclosed embodiments, as well as other embodiments, are also included within the scope of the appended claims. These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts.

As used herein, the term "or" includes any and all combinations of one or more of the associated listed items. In addition, unless explicitly described to the contrary, the word "comprise" and variations such as "comprises" or "comprising", will be understood to imply the inclusion of stated elements but not the exclusion of any other elements.

It is to be understood that, although the terms 'first', 'second', 'third', and so on, may be used herein to describe various elements, these elements should not be limited by these terms. These terms are used only for the purpose of distinguishing one component from another component. Thus, a first element discussed herein could be termed a second element without altering the description of the present invention.

The assembled industrial tablet disclosed in the present invention comprises a screen assembly and a tablet assembly, and the screen assembly and the tablet assembly are separately described below.

Figure 1A:
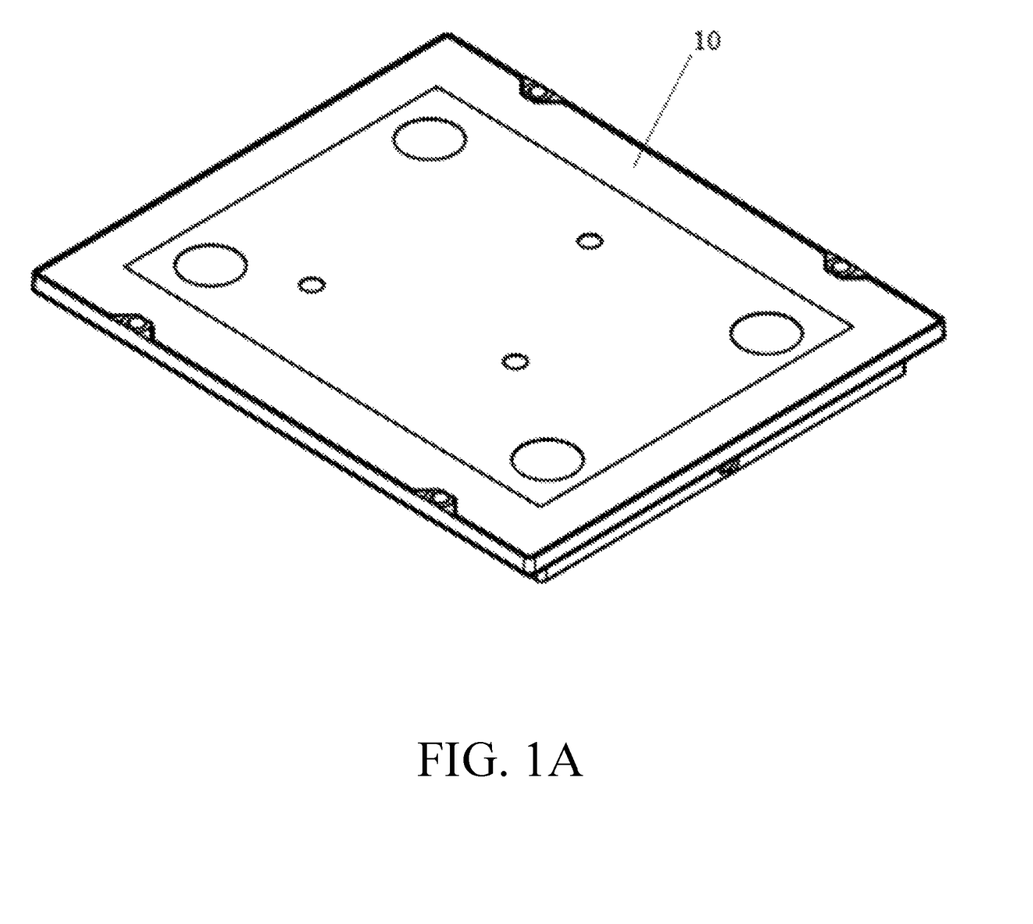
FIG. 1A is a first perspective view of a screen assembly of an assembled industrial tablet of the present invention.
Figure 1B:
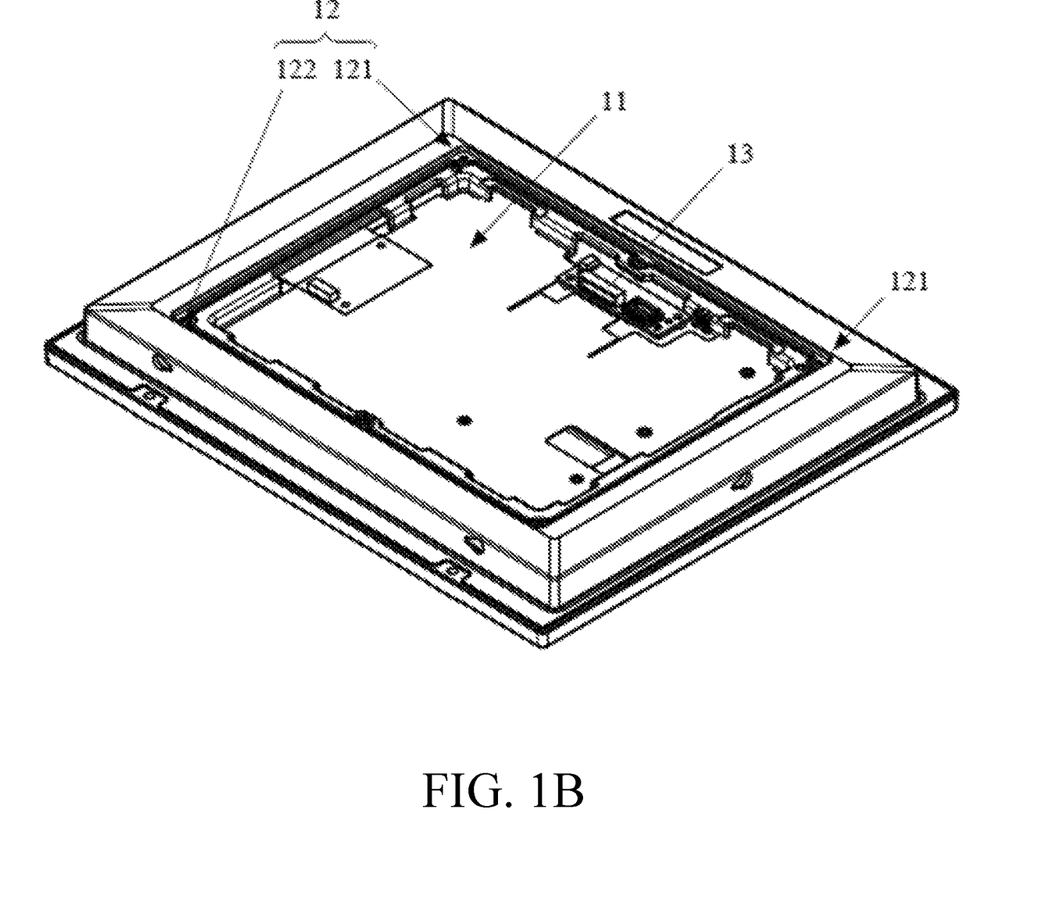
FIG. 1B is a second perspective view of the screen assembly of the assembled industrial tablet of the present invention.

Please refer to FIG. 1A and FIG. 1B, wherein FIG. 1A is a first perspective view of a screen assembly of an assembled industrial tablet of the present invention, and FIG. 1B is a second perspective view of the screen assembly of the assembled industrial tablet of the present invention.

The screen assembly 10 has an assembly space 11, and a plurality of limiting structures 12 disposed around the assembly space 11. The screen assembly 10 has a first floating connector 13 exposed to the assembly space 11, and each limiting structure 12 is an assembly of a limiting slot 121 and a screw hole 122.

Figure 2A:
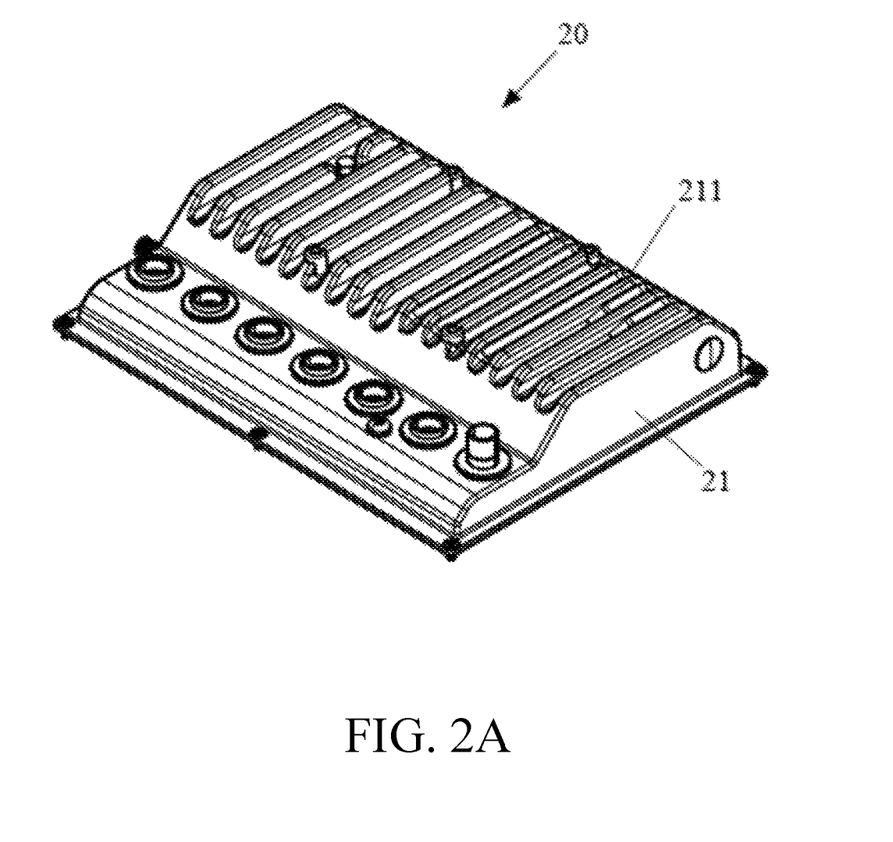
FIG. 2A is a first perspective view of a tablet assembly of the assembled industrial tablet of the present invention.
Figure 2B:
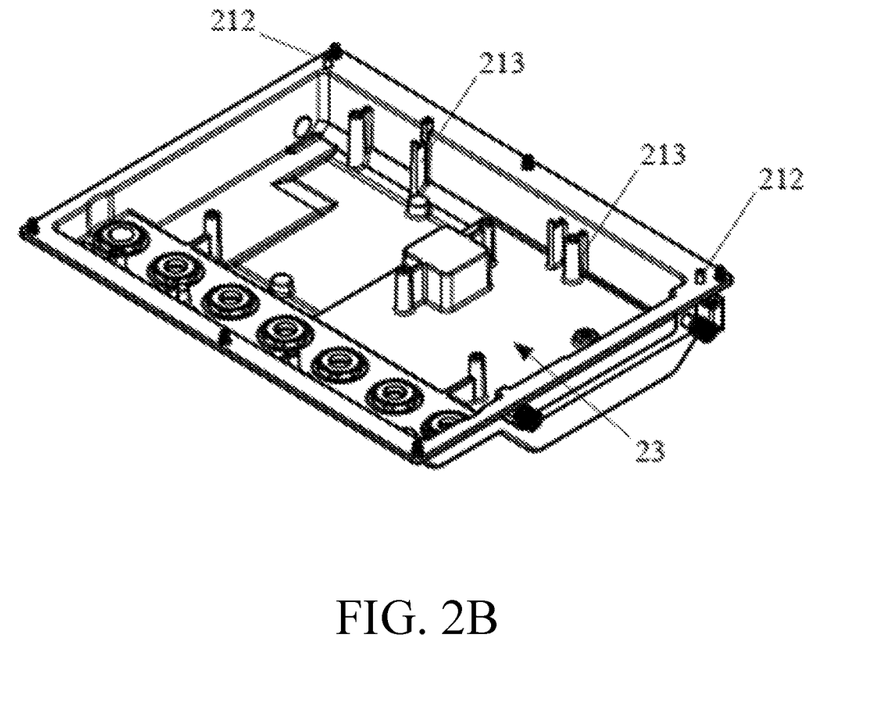
FIG. 2B is an exploded view of a second perspective view of the tablet assembly of the assembled industrial tablet of the present invention.
Figure 2C:
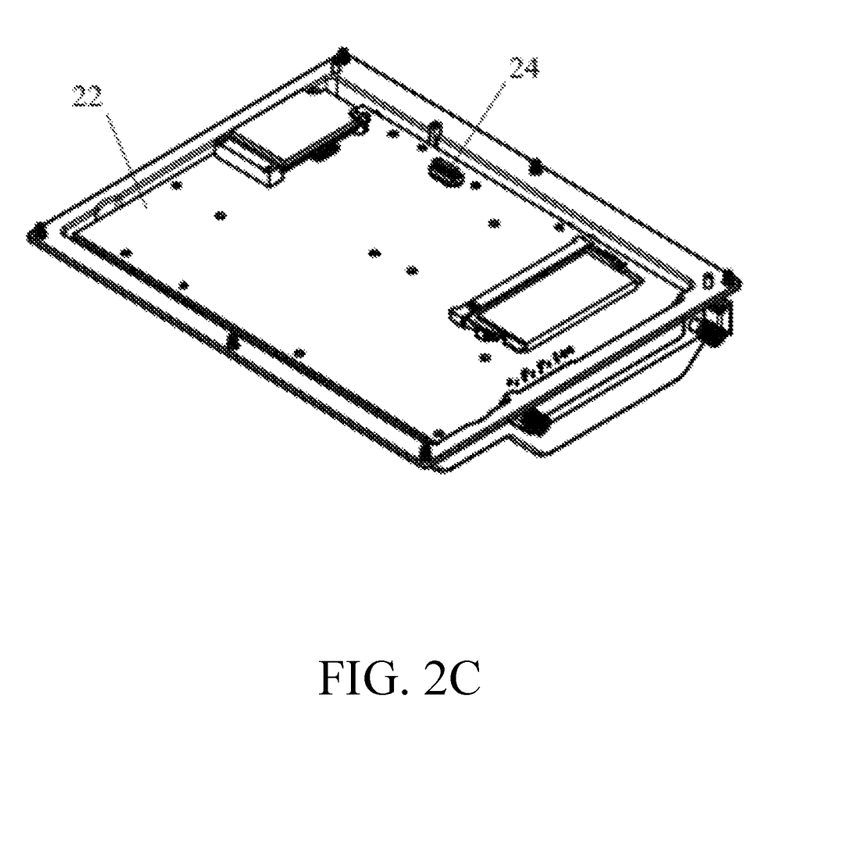
FIG. 2C is an assembly view of the second perspective view of the tablet assembly of the assembled industrial tablet of the present invention.

Please refer to FIG. 2A, FIG. 2B and FIG. 2C, wherein FIG. 2A is a first perspective view of a tablet assembly of the assembled industrial tablet of the present invention, FIG. 2B is an exploded view of a second perspective view of the tablet assembly of the assembled industrial tablet of the present invention, and FIG. 2C is an assembly view of the second perspective view of the tablet assembly of the assembled industrial tablet of the present invention.

The tablet assembly 20 comprises a housing component 21 having an accommodating space 23, and a circuit substrate 22 disposed in the accommodating space 23 and having a second floating connector 24.

There is a plurality of heat sinks 211 disposed on the exterior of the housing component 21 to provide heat dissipation from electronic components on the circuit substrate 22 disposed in the accommodating space 23. The housing component 21 is made of a metal or an alloy with a high thermal conductivity, such as iron, steel, aluminum, aluminum and alloy. This is for illustrative purposes only and is not intended to limit the scope of application of the invention.

There is a plurality of structural limiting portions 212 on the interior of the housing component 21. The shape design and arrangement position of the plurality of structural limiting portions 212 of the housing component 21 form the accommodation space 23 in which the circuit substrate 22 can be disposed. There is also a plurality of structural reinforcing portions 213 on the interior of the housing component 21. The s plurality of structural reinforcing portion 213 of the housing component 21 is used to enhance the robustness of the housing component 21. It is noted that the structural limiting portions 212 can also be regarded as the structural reinforcing portions 213. This is for illustrative purposes only and is not intended to limit the scope of application of the invention.

Figure 3A:
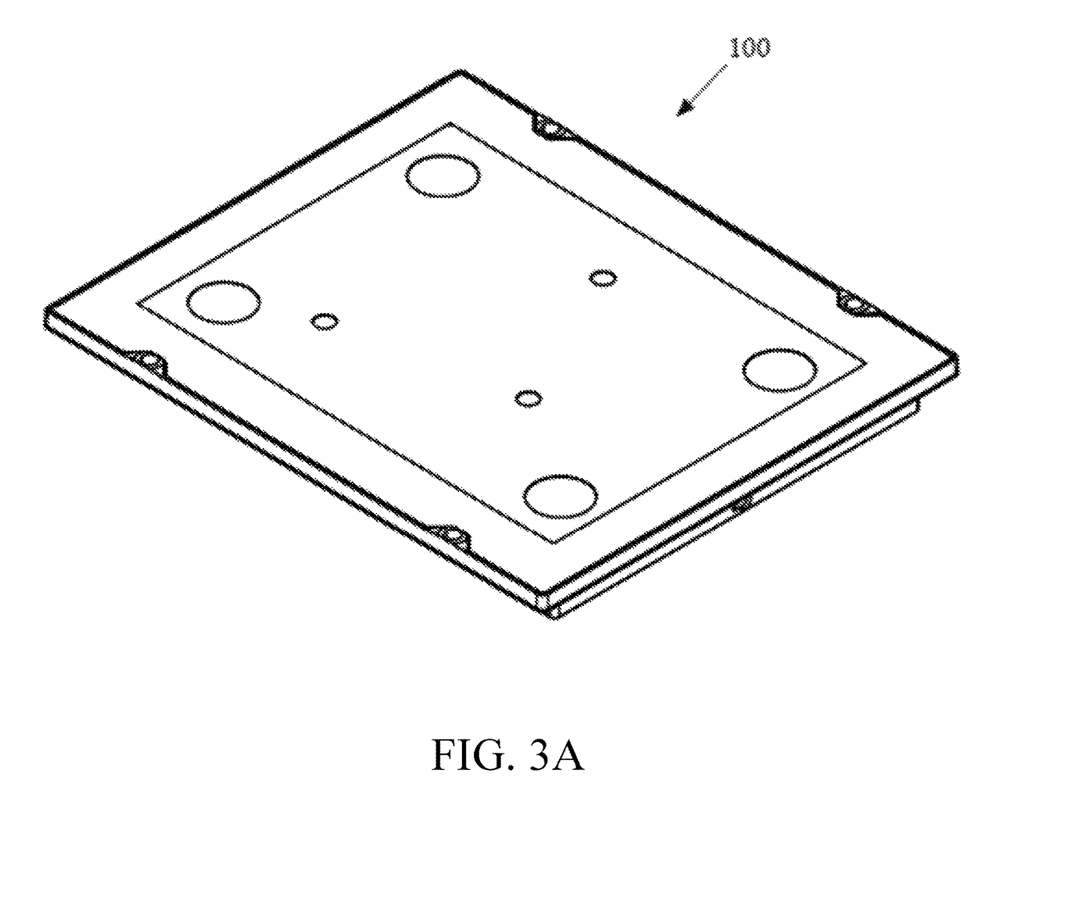
FIG. 3A is a first perspective view of the assembled industrial tablet of the present invention.
Figure 3B:
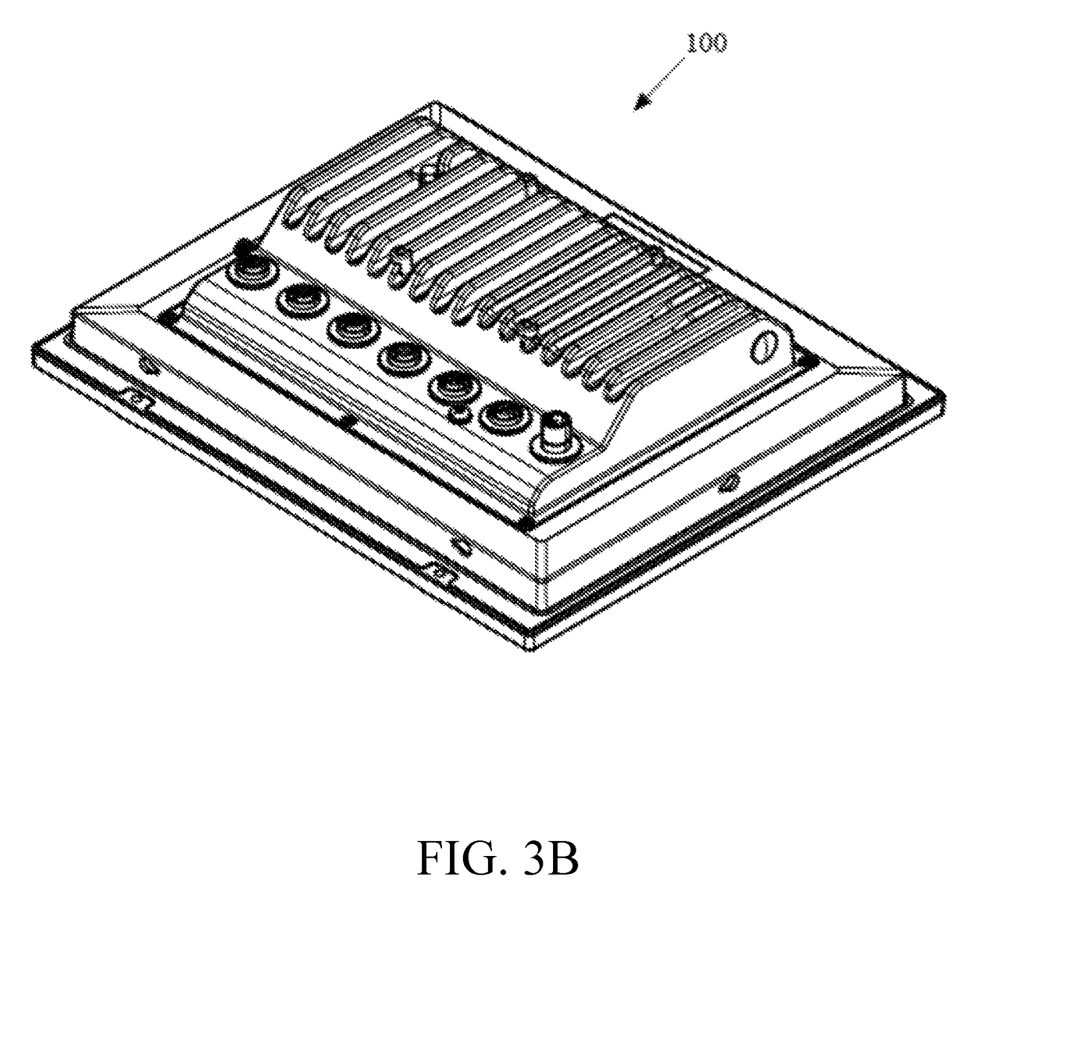
FIG. 3B is a second perspective view of the assembled industrial tablet of the present invention.

The screen assembly 10 and the tablet assembly 20 are assembled through the first floating connector 13 and the second floating connector 24, and the tablet assembly 20 is limited in the assembly space 11 of the screen assembly 10 through the plurality of limiting structures 12 of the screen assembly 10, so that the industrial tablet 100 is assembled. For the assembled industrial tablet 100, please refer to FIG. 3A and FIG. 3B, wherein FIG. 3A is a first perspective view of the assembled industrial tablet of the present invention, and FIG. 3B is a second perspective view of the assembled industrial tablet of the present invention.

Since the assembly of the floating connectors with each other has a large assembly tolerance, the screen assembly 10 and the tablet assembly 20 can be assembled through the first floating connector 13 and the second floating connector 24, and the tablet assembly 20 is limited in the assembly space 11 of the screen assembly 10 through the plurality of limiting structures 12 of the screen assembly 10, thereby improving assembly convenience when assembling industrial tablet 100.

Figure 4A:
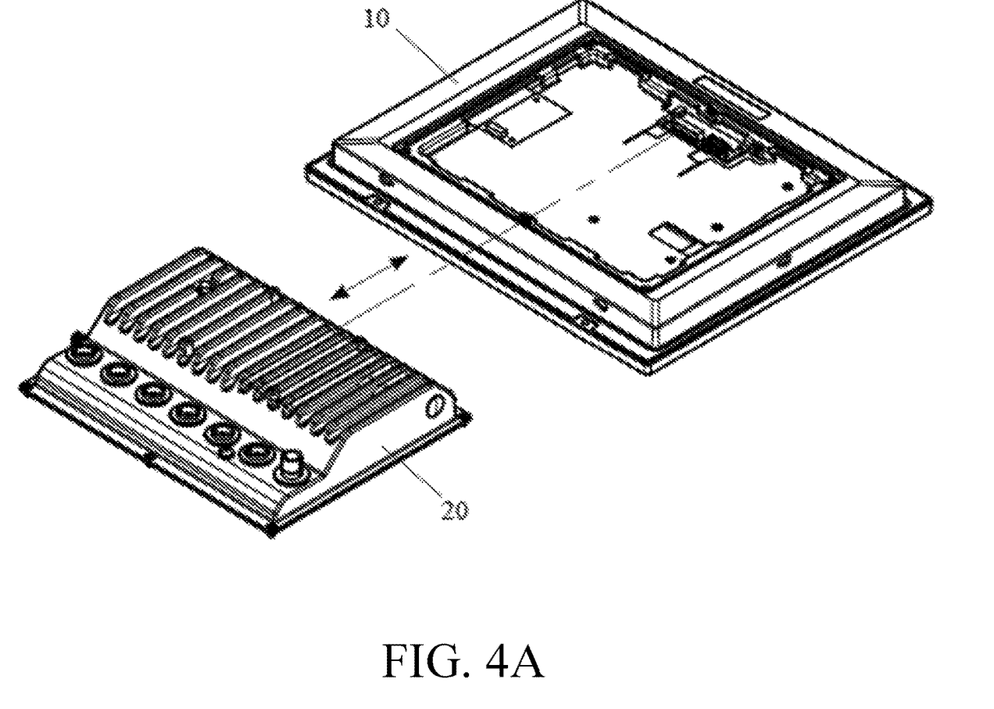
FIG. 4A is an exploded view of a first assembled aspect showing the screen assembly and the tablet assembly of the assembled industrial tablet of the present invention.
Figure 4B:
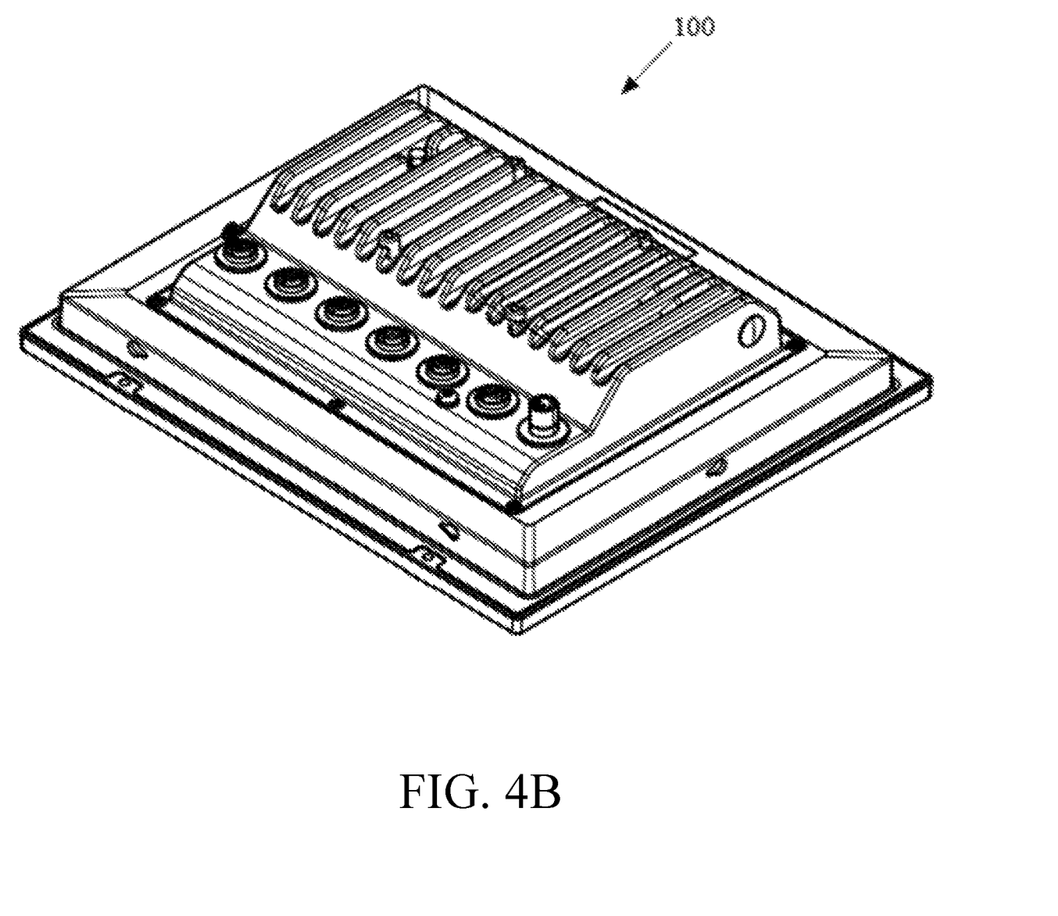
FIG. 4B is an assembly view of the first assembled aspect showing the screen assembly and the tablet assembly of the assembled industrial tablet of the present invention.

Please refer to FIG. 4A and FIG. 4B, wherein FIG. 4A is an exploded view of a first assembled aspect showing the screen assembly and the tablet assembly of the assembled industrial tablet of the present invention, and FIG. 4B is an assembly view of the first assembled aspect showing the screen assembly and the tablet assembly of the assembled industrial tablet of the present invention.

In the first assembly aspect of the screen assembly 10 and the tablet assembly 20, the tablet assembly 20 moves in a direction parallel with the screen assembly 10 to assemble the first floating connector 13 and the second floating connector 24, and the tablet assembly 20 is limited in the assembly space 11 of the screen assembly 10 through the plurality of limiting structures 12 of the screen assembly 10, so that the industrial tablet 100 is assembled.

It should be noted that, in the first assembly aspect of the screen assembly 10 and the tablet assembly 20, each limiting structure 12 of the screen assembly 10 can have a limiting slot 121 and a screw hole 122. Through the guiding of the limiting slots 121 and the screwing of the screw holes 122, the screen assembly 10 and the tablet assembly 20 can be assembled through the first floating connector 13 and the second floating connector 24, and the tablet assembly 20 is limited in the assembly space 11 of the screen assembly 10 through the plurality of limiting structures 12 of the screen assembly 10, so that the industrial tablet 100 is assembled.

Figure 5A:
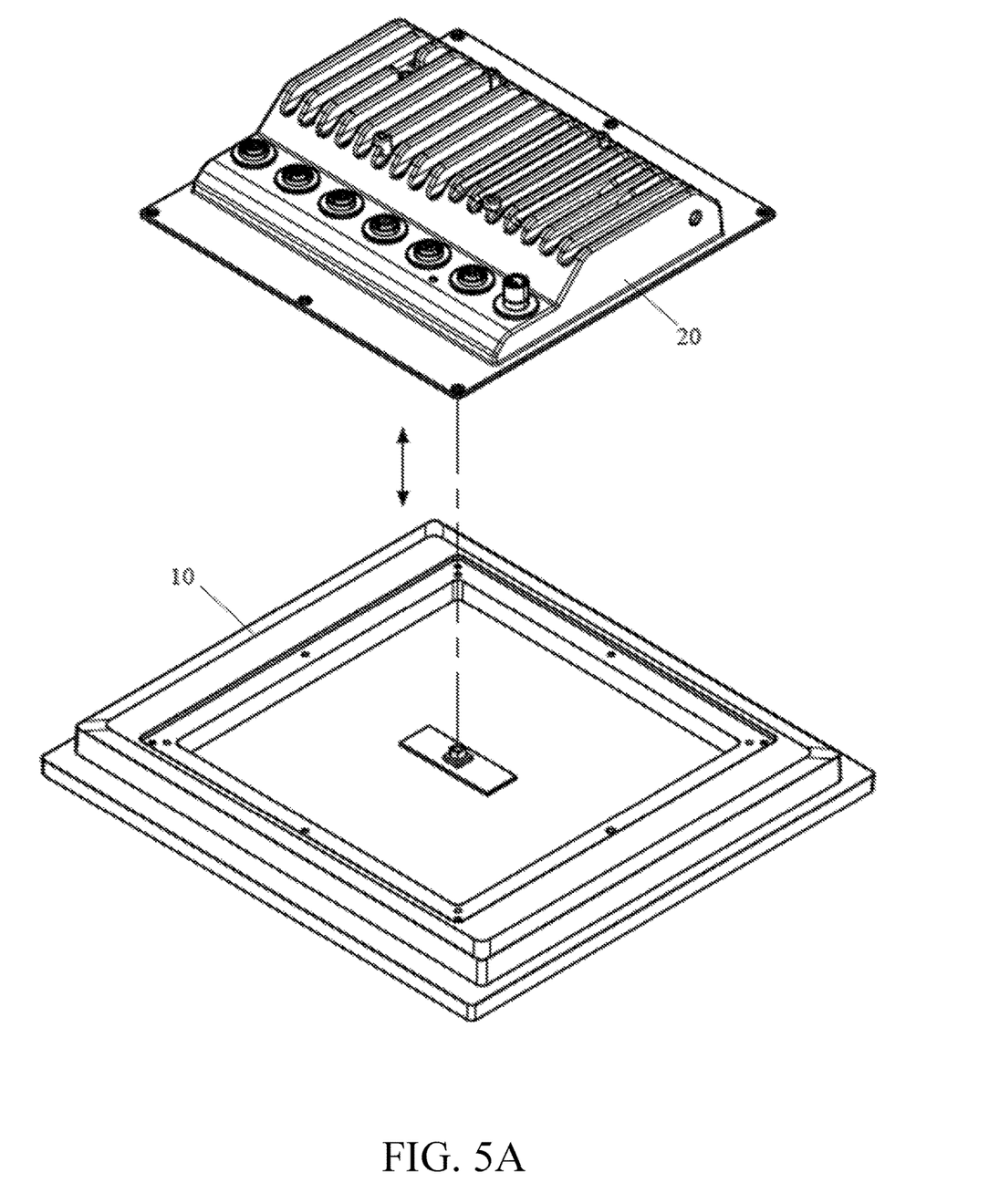
FIG. 5A is an exploded view of a second assembled aspect showing the screen assembly and the tablet assembly of the assembled industrial tablet of the present invention.
Figure 5B:
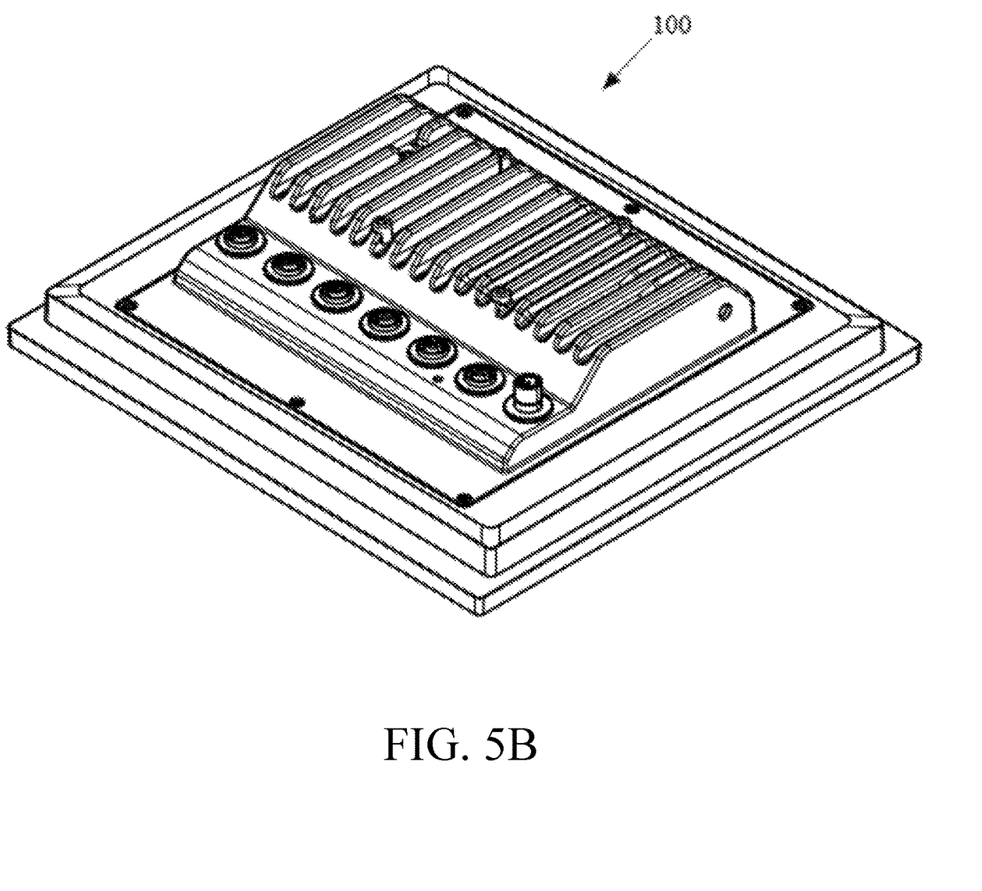
FIG. 5B is an assembly view of the second assembled aspect showing the screen assembly and the tablet assembly of the assembled industrial tablet of the present invention.

Please refer to FIG. 5A and FIG. 5B, wherein FIG. 5A is an exploded view of a second assembled aspect showing the screen assembly and the tablet assembly of the assembled industrial tablet of the present invention, and FIG. 5B is an assembly view of the second assembled aspect showing the screen assembly and the tablet assembly of the assembled industrial tablet of the present invention.

In the second assembly aspect of the screen assembly 10 and the tablet assembly 20, the tablet assembly 20 moves toward the screen assembly 10 in a direction perpendicular to a ground plane to assemble the first floating connector 13 and the second floating connector 24, and the tablet assembly 20 is limited in the assembly space 11 of the screen assembly 10 through the plurality of limiting structures 12 of the screen assembly 10, so that the industrial tablet 100 is assembled.

It should be noted that, in the second assembly aspect of the screen assembly 10 and the tablet assembly 20, each limiting structure 12 of the screen assembly 10 only has the screw holes 122. By the screwing of the screw holes 122, the screen assembly 10 and the tablet assembly 20 can be assembled through the first floating connector 13 and the second floating connector 24, and the tablet assembly 20 is limited in the assembly space 11 of the screen assembly 10 through the limiting structures 12 of the screen assembly 10, so that the industrial tablet 100 is assembled.

Figure 6A:
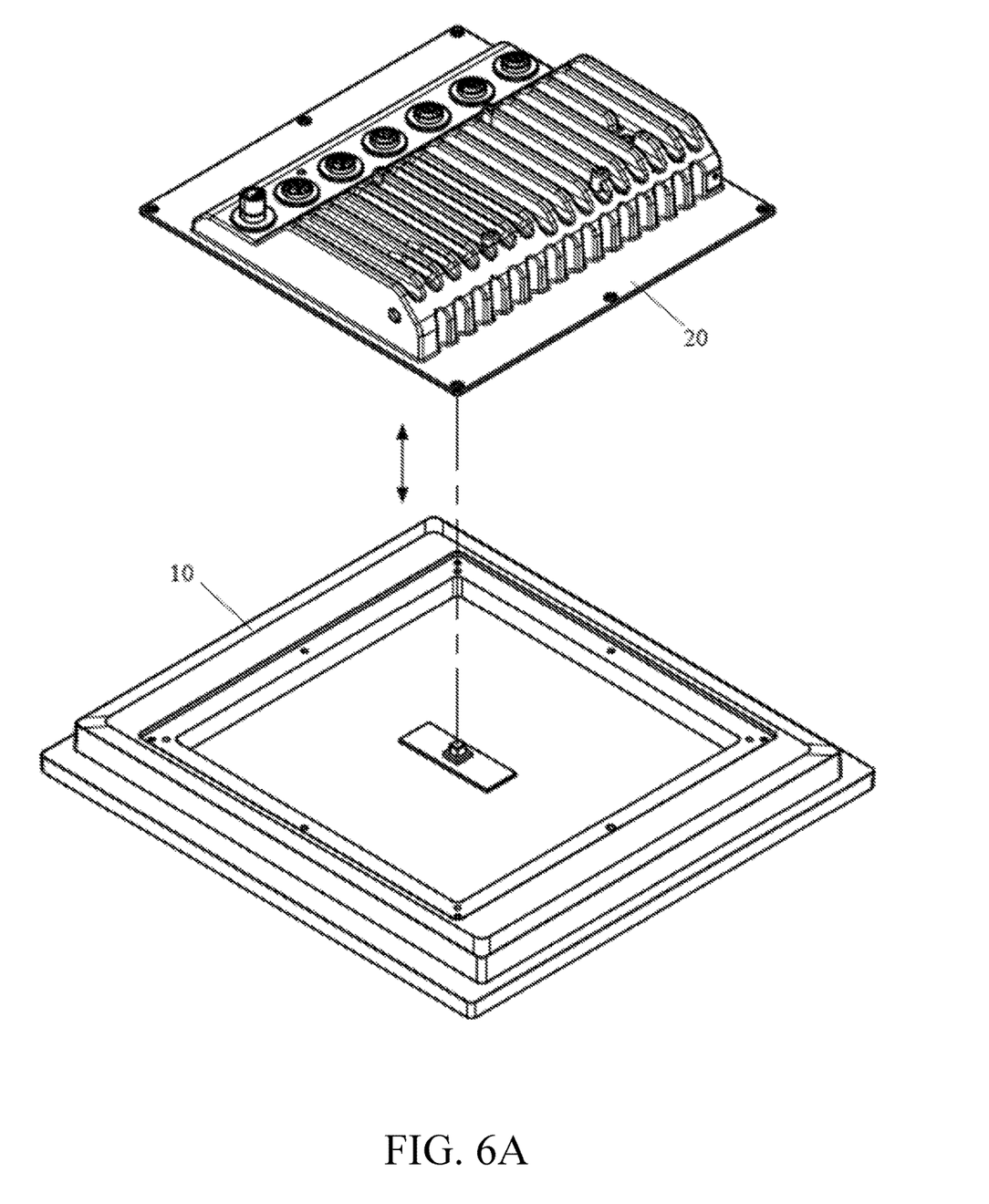
FIG. 6A is an exploded view of a third assembled aspect showing the screen assembly and the tablet assembly of the assembled industrial tablet of the present invention.
Figure 6B:
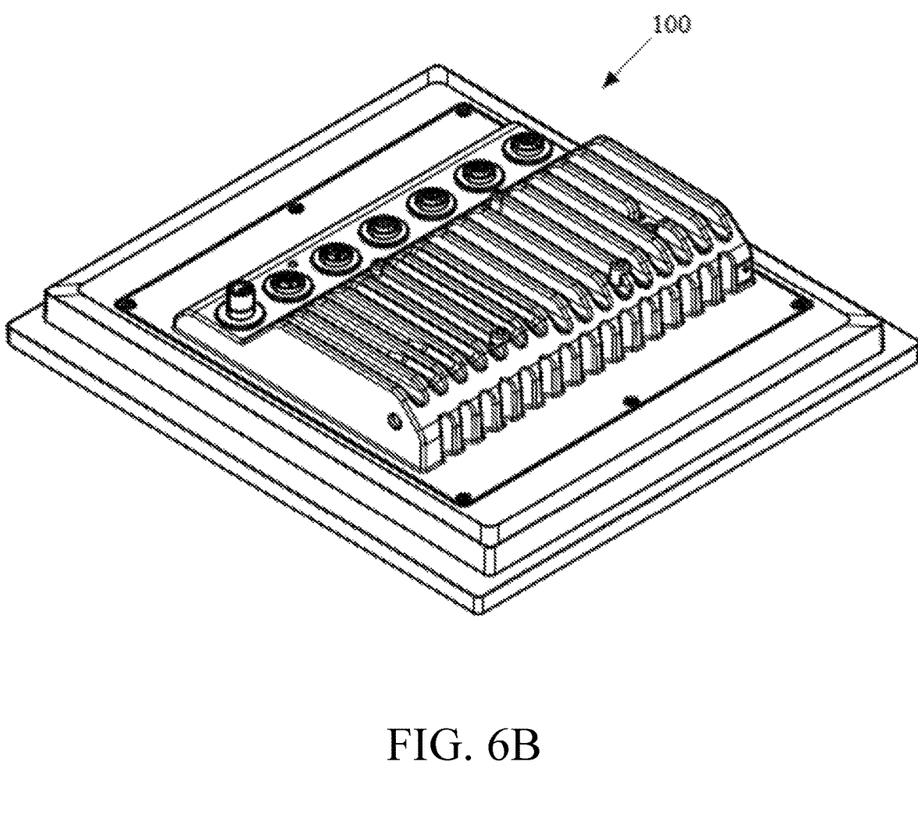
FIG. 6B is an assembly view of the third assembled aspect showing the screen assembly and the tablet assembly of the assembled industrial tablet of the present invention.

Please refer to FIG. 6A and FIG. 6B, wherein FIG. 6A is an exploded view of a third assembled aspect showing the screen assembly and the tablet assembly of the assembled industrial tablet of the present invention, and FIG. 6B is an assembly view of the third assembled aspect showing the screen assembly and the tablet assembly of the assembled industrial tablet of the present invention.

In the third assembly aspect of the screen assembly 10 and the tablet assembly 20, the tablet assembly 20 rotates 90 degrees in parallel with the screen assembly 10 relative to the second assembly aspect, and then moves toward the screen assembly 10 in the direction perpendicular to the ground plane to assemble the first floating connector 13 and the second floating connector 24, and the tablet assembly 20 is limited in the assembly space 11 of the screen assembly 10 through the plurality of limiting structures 12 of the screen assembly 10, so that the industrial tablet 100 is assembled.

It should be noted that, in the third assembly aspect of the screen assembly 10 and the tablet assembly 20, each limiting structure 12 of the screen assembly 10 only has the screw holes 122. By the screwing of the screw holes 122, the screen assembly 10 and the tablet assembly 20 can be assembled through the first floating connector 13 and the second floating connector 24, and the tablet assembly 20 is limited in the assembly space 11 of the screen assembly 10 through the limiting structures 12 of the screen assembly 10, so that the industrial tablet 100 is assembled.

Figure 7A:
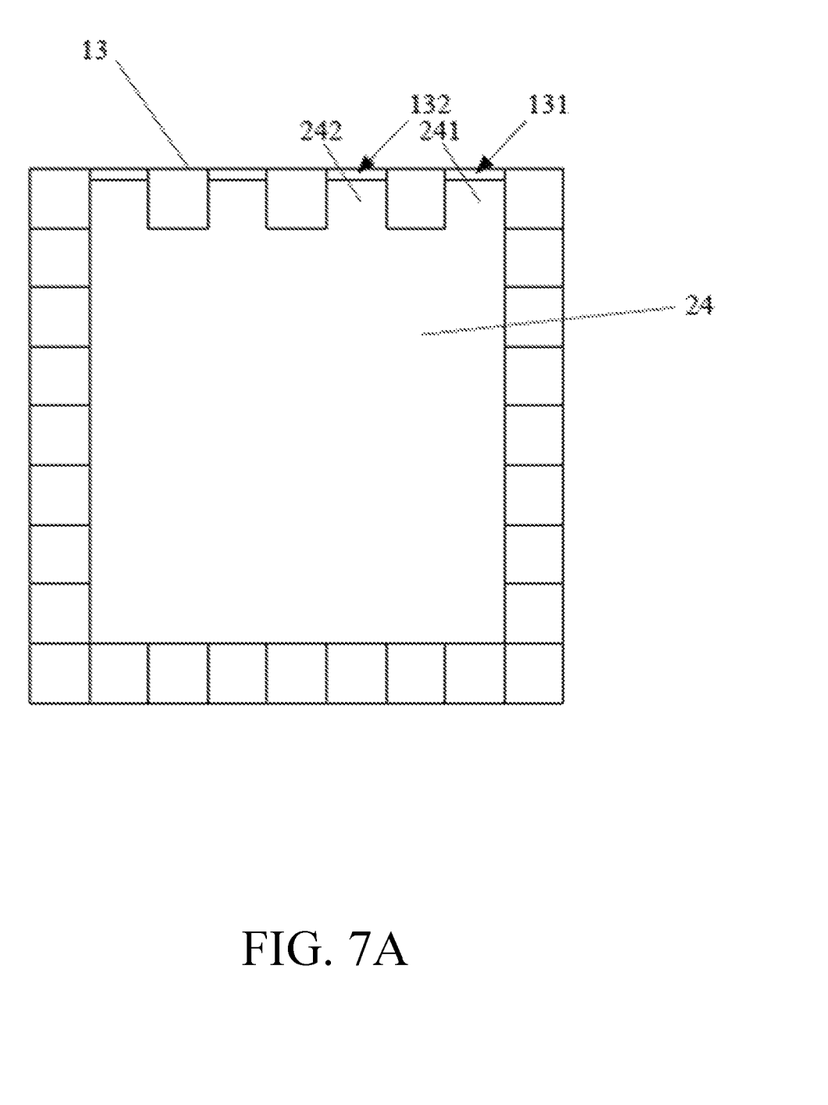
FIG. 7A is a plan view showing the connection of the second assembly aspect of the screen assembly and the tablet assembly of the assembled industrial tablet of the present invention.
Figure 7B:
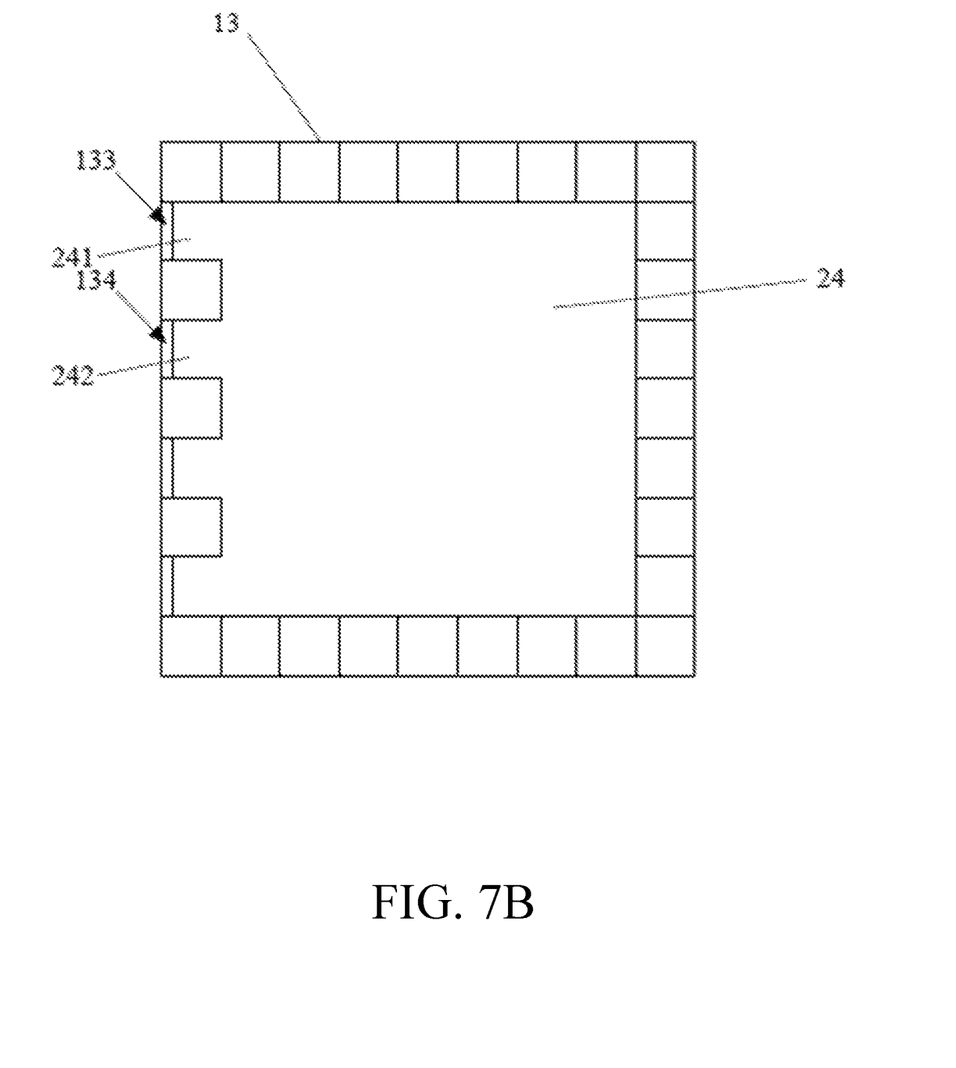
FIG. 7B is a plan view showing the connection of the third assembly aspect of the screen assembly and the tablet assembly of the assembled industrial tablet of the present invention.

Please refer to FIG. 7A and FIG. 7B, wherein FIG. 7A is a plan view showing the connection of the second assembly aspect of the screen assembly and the tablet assembly of the assembled industrial tablet of the present invention, and FIG. 7B is a plan view showing the connection of the third assembly aspect of the screen assembly and the tablet assembly of the assembled industrial tablet of the present invention.

In the second assembly aspect and the third assembly aspect, there are connection pins on a single side of the second floating connector 24, and there are matching pins arranged on each side of the first floating connector 13, wherein the number of the matching pins on each side of the first floating connector 13 and the number of the connection pins on the single side of the second floating connector 24 are the same as shown in FIG. 7A and FIG. 7B. This is for illustrative purposes only and is not intended to limit the scope of application of the invention.

As shown in FIG. 7A, when the screen assembly 10 and the tablet assembly 20 are assembled by the first floating connector 13 and the second floating connector 24, the first pin 241 of the second floating connector 24 is inevitably connected to the first pin 131 of the first floating connector 13, and the second pin 242 of the second floating connector 24 is inevitably connected to the second pin 132 of the first floating connector 13, and the remaining pins of the second floating connectors 24 can be connected to the remaining pins of the first floating connector 13 in the same manner, and the second floating connector 24 and the first floating connector 13 can be based on the connected pins for correct data transmission.

As shown in FIG. 7B, when the screen assembly 10 and the tablet assembly 20 are assembled by the first floating connector 13 and the second floating connector 24, the first pin 241 of the second floating connector 24 is inevitably connected to the third pin 133 of the first floating connector 13, and the second pin 242 of the second floating connector 24 is inevitably connected to the fourth pin 134 of the first floating connector 13, and the remaining pins of the second floating connectors 24 can be connected to the remaining pins of the first floating connector 13 in the same manner, and the second floating connector 24 and the first floating connector 13 can be based on the connected pins for correct data transmission.

To summarize, the difference between the present disclosure and the conventional technology is that the first floating connector disposed on the screen assembly and the second floating connector disposed on the tablet assembly are assembled, and the limiting structures of the screen assembly limits the tablet assembly in the assembly space of the screen assembly, so that the industrial tablet is assembled.

The problem of the prior art of assembly interference due to the connection lines or damaging the connection lines when assembling the screen assembly and the tablet assembly can be solved, thereby improving the assembly convenience of the assembled industrial tablet.

The present disclosure disclosed herein has been described by means of specific embodiments. However, numerous modifications, variations and enhancements can be made thereto by those skilled in the art without departing from the spirit and scope of the invention set forth in the claims.

What is claimed is:

1. An assembled industrial tablet, comprising:
a screen assembly, comprising an assembly space, a plurality of limiting structures disposed around the assembly space, and a first floating connector exposed to the assembly space; and
a tablet assembly, comprising a housing component and a circuit substrate, the housing component having an accommodating space, the circuit substrate being disposed in the accommodating space, a second floating connector being disposed on the circuit substrate;

wherein the screen assembly and the tablet assembly are assembled by the first floating connector and the second floating connector, and the tablet assembly is limited in the assembly space of the screen assembly through the plurality of limiting structures of the screen assembly, so that the industrial tablet is assembled.

2. The assembled industrial tablet according to claim 1, wherein the tablet assembly moves in a direction parallel with the screen assembly to assemble the first floating connector and the second floating connector, and the tablet assembly is limited in the assembly space of the screen assembly through the plurality of limiting structures of the screen assembly, so that the industrial tablet is assembled.

3. The assembled industrial tablet according to claim 1, wherein the tablet assembly moves toward the screen assembly in a direction perpendicular to a ground plane to assemble the first floating connector and the second floating connector, and the tablet assembly is limited in the assembly space of the screen assembly through the plurality of limiting structures of the screen assembly, so that the industrial tablet is assembled.

4. The assembled industrial tablet according to claim 1, wherein after the tablet assembly rotates 90 degrees in parallel with the screen assembly, the tablet assembly moves toward the screen assembly in a direction perpendicular to an ground plane to assemble the first floating connector and the second floating connector, and the tablet assembly is limited in the assembly space of the screen assembly through the plurality of limiting structures of the screen assembly, so that the industrial tablet is assembled.

5. The assembled industrial tablet according to claim 1, wherein there is a plurality of heat sinks disposed on the exterior of the housing component to provide heat dissipation from electronic components on the circuit substrate.

6. The assembled industrial tablet according to claim 1, wherein the housing component is made of a metal or an alloy with a high thermal conductivity.

7. The assembled industrial tablet according to claim 1, wherein there is a plurality of structural limiting portions on the interior of the housing component, and the plurality of structural limiting portions forms the accommodating space.

8. The assembled industrial tablet according to claim 1, wherein there is a plurality of structural reinforcing portions on the interior of the housing component, and the plurality of structural reinforcing portions is used to enhance the robustness of the housing component.

9. The assembled industrial tablet according to claim 1, wherein each of the plurality of limiting structures is an assembly of a limiting slot and a screw hole.

* * * * *